(12) United States Patent
Sherman et al.

(10) Patent No.: US 6,766,086 B1
(45) Date of Patent: Jul. 20, 2004

(54) OPTICAL FIBER ARRAY WITH PRECISE FIBER POSITIONING

(75) Inventors: Jonathan Sherman, Caldwell, ID (US); Theodore C. Rich, Basking Ridge, NJ (US); Irfan Camlibel, Bedminster, NJ (US)

(73) Assignee: Fiberguide Industries, Inc., Stirling, NJ (US)

( * ) Notice: Subject to any disclaimer, the term of this patent is extended or adjusted under 35 U.S.C. 154(b) by 91 days.

(21) Appl. No.: 10/087,455

(22) Filed: Mar. 1, 2002

(51) Int. Cl.[7] .................................................. G02B 6/00
(52) U.S. Cl. .......................... 385/52; 385/137; 385/136
(58) Field of Search ................................ 385/134–137, 385/52, 62, 63, 65

(56) References Cited

U.S. PATENT DOCUMENTS 6,640,042 B2 * 10/2003 Araki et al. ................. 385/137

2002/0172490 A1 * 11/2002 Bonja .......................... 385/137
2002/0197047 A1 * 12/2002 Basavanhally et al. ..... 385/137

* cited by examiner

Primary Examiner—Brian Healy
Assistant Examiner—Kevin S. Wood
(74) Attorney, Agent, or Firm—Edward Dreyfus, Esq.

(57) ABSTRACT

Optical fiber array apparatus comprising housing front mask having a matrix of fiber seating openings each opening having one or more side walls. An optical fiber extends through each opening and means presses the fiber side surface into engagement with the one or more side walls to precisely position and secure the fiber. Bonding material then fills all voids in and around the opeining. In one embodiment, a clamping wafer behind the front mask moves to clamp the fibers to the front mask opening walls. In another, the front mask defines flexing arms with distal ends that clamp fibers to opening walls and in yet another elongated flexible members lie along front mask slots to clamp fibers in openings that communicate into the slots.

13 Claims, 11 Drawing Sheets

OPTICAL FIBER ARRAY WITH PRECISE FIBER POSITIONING

BACKGROUND OF INVENTION

The present invention relates to fiber optic arrays and more particularly to large, matrix configured arrays and the method and tools for making the same. Fiber optics has been the driving force in the communication revolution which has enabled carriers to achieve enormous data throughput. In order to realize the full potential of the technology, fiberoptics will be incorporated into every facet of the integrated electronics, which will then make it possible to fully utilize the enormous bandwidth of the optical fiber with the high speeds of the semiconductor integrated circuitry. To this end, arrays of optical fibers need to be coupled precisely and reliably to semiconductor laser and detector arrays on a chip.

Already, various groups throughout the world have demonstrated feasibility of high-speed optoelectronic VLSI switching and two dimensional fiberoptic arrays for an optical crossbar switch. In 1996, reports were published of achieving approximately + or –5 micrometer fiber positional accuracy. In June 1997, Messrs. J. Sherman et al. filed and obtained on May 25, 1999 U.S. Pat. No. 5,907,650 by Fiberguide Industries, Inc. relating to a new method and array achieving at least + or –2 micrometer fiber positional accuracy. Although these advances in the art enhance the accuracy and reliability of fiber arrays, they introduce or amplify other technical problems that must be solved to satisfy industry's need for large number, reliable, high precision, fiber matrix arrays. For example, as the demand for the number of fibers in matrix arrays increases, from 8×8 just a few years ago to the present more than 128×128, assembly problems arise because of the difficulty in handling and positioning and securing the large number of fibers in the assembly.

SUMMARY OF EXEMPLARY EMBODIMENT OF THE PRESENT INVENTION

A primary object of the present invention is to provide new connector apparatus and methods of assembly that solve the aforementioned problems, provide an efficient and reliable manufacturing method for such large element number arrays and produce such a fiber array connector matrix with highly accurate and reliable fiber placement that is sufficiently robust for further installation and use in the field.

Another primary object of the present invention is to provide such an optical array with enhanced precision compared to the known prior art, which can be effectively and efficiently manufactured, with lower unit costs than currently available products. This is accomplished, according to the principles of the present invention by providing a front mask with fiber seating opening side walls and means for pressing the inserted fiber outer surface against those walls for secure and precise lateral positioning. Each opening can be any suitable shape and bonding material, preferably fills the voids between the fiber and opening walls.

One exemplary embodiment according to the principles of the present invention includes a front mask wafer, a clamping wafer, and a rear wafer mounted to the front face of a suitable housing. Each wafer includes openings of suitable shape, longitudinally aligned and slightly larger than the fiber to allow easy longitudinal insertion. In one example, the openings are generally square or rectangular in shape with the corner-to-corner diameter arranged in a predetermined direction, such as vertically. Once all desired fibers are inserted into all predetermined mask openings, the clamping wafer is moved slightly in the predetermined direction so that its opening upper walls force the respective fiber against the lower walls of the front mask and rear wafer openings. This action presses the fiber in a precise position relative to the front mask-opening array. The clamping wafer is then secured relative to the housing and bonding material is applied as desired. Grinding and polishing the bonding material, fiber tip and front mask surface completes the sub-assembly preparation. Some of the benefits of this method include easy fiber insertion without having to etch or shape the tip to a conical shape although, it does not preclude each pre-shaping. Also, the method accommodates insertion and securing ribbon fibers which are assured of being of the same length in the final assembly.

An alternate embodiment precisely secures the fibers in the array by providing a wafer with unconnected openings that have a transverse dimension slightly smaller than that of the fiber outer diameter. The wafer material defines two sides of each opening which are etched or otherwise shaped into one or two flexible independently movable arms extending away from the opening. The proximal end of each arm is integral with the main wafer body. The arm(s) distal end(s) deflect in response to the fiber insertion causing the fiber to seat against the other two, non-movable sides of the opening. Bonding, polishing, finishing follows all fiber seating. In one embodiment, the opening is square and each of two adjacent sides comprise a flexible arm, and the arms press the fiber into engagement with the other two sides of the square opening.

Other and further objects and benefits of the present invention shall become apparent with the following detailed description of exemplary embodiments when taken in view of the appended drawings, in which:

DETAILED DESCRIPTION OF EXEMPLARY EMBODIMENTS OF INVENTION

One exemplary embodiment of an optical fiber array according to the principles of the present invention is shown in FIGS. 1–8. Array assembly 10 includes a suitable housing 5 to house and secure array of optical fibers 6 and first wafer 1, a second wafer 2, and a third wafer 3 include openings 12, 14, and 16, respectively, arranged in predetermined congruent patterns such as rows and columns generally as shown. As described below wafers 1, 2, and 3 and openings 12, 14, and 16 cooperate to initially seat and ultimately precisely secure each fiber at a precise position prior to subsequent process steps of application of epoxy, grinding, polishing and assembly of the final array apparatus. Wafers 1, 2, 3 can be made of any suitable material for the precise formation and positioning of openings. Etched silicon wafers is one example of a suitable material and hole formation technique. In this example openings 12, 14, 16 are generally square or diamond shaped with one diameter vertically oriented, however, other shapes and orientations can be used.

It is important that the opening arrays of wafers 1, 2, 3 be precisely aligned with each other and with other elements of the final array apparatus or connector. In this example wafers 1, 2, 3 include alignment holes 18, 20, and 22 respectively to accommodate positioning pins 4. However, holes 22 are vertically elongated to permit slight vertical displacement of wafer 2 relative pins 4 and wafers 1, 3.

Figure 1:
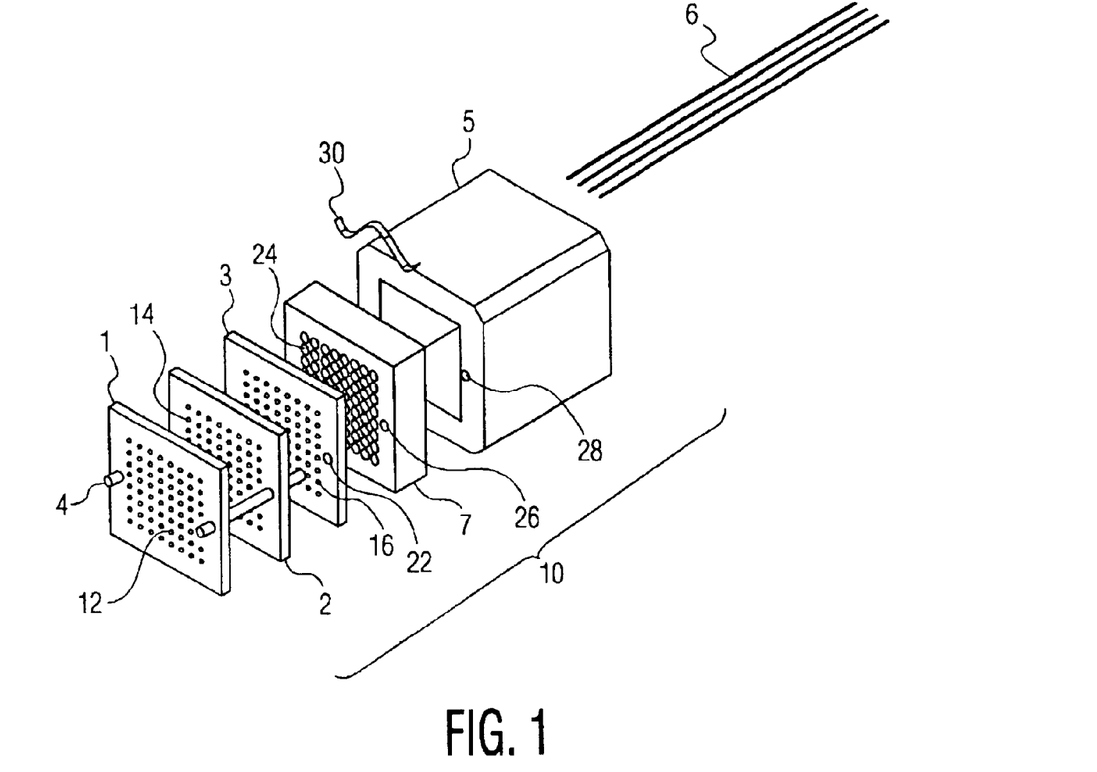
FIG. 1 is an exploded perspective view of one exemplary embodiment according to the principles of the present invention.
Figure 2:
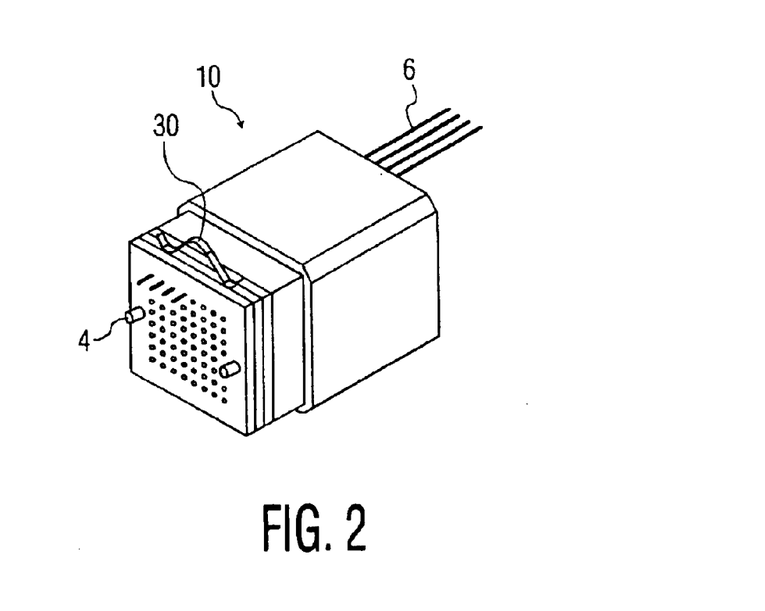
FIG. 2 is similar to FIG. 1 showing the parts assembled prior to displacement of the second wafer.
Figure 3:
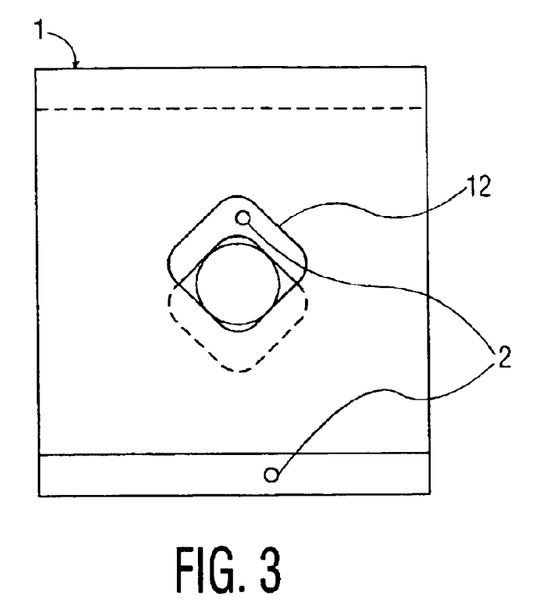
FIG. 3 is a partial front view of the area around one of the front wafer openings after the second wafer is displaced.
Figure 4:
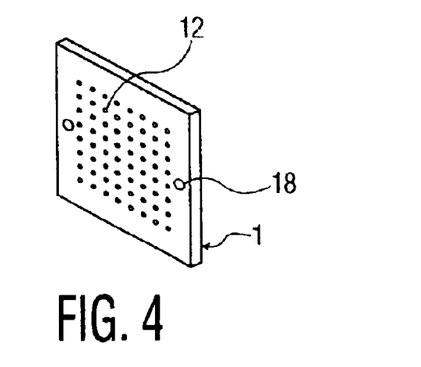
FIG. 4 is a perspective view of the first or third wafer of FIG. 1.
Figure 5:
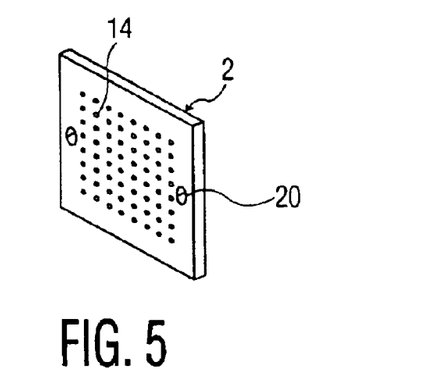
FIG. 5 is a perspective of the second wafer of FIG. 1.
Figure 6:
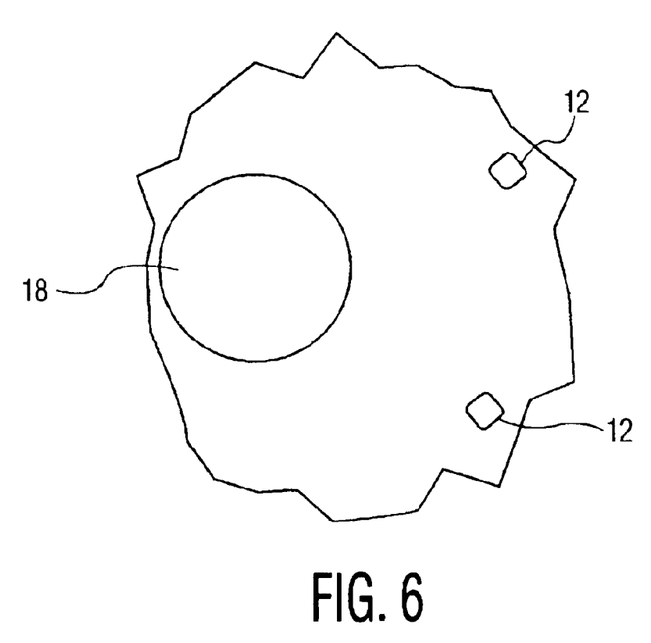
FIG. 6 is a partial front view of an alignment hole area of FIG. 4.
Figure 7:
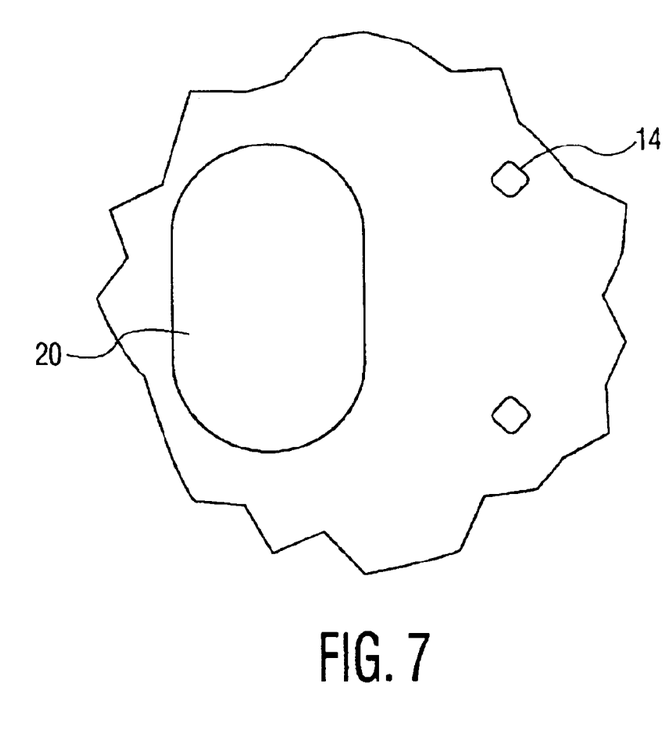
FIG. 7 is a partial front view of an alignment hole area of FIG. 5.
Figure 8:
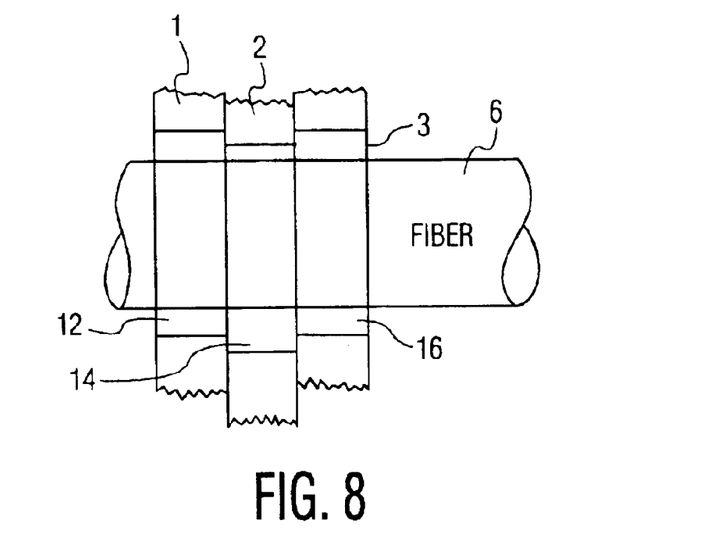
FIG. 8 is a partial side view of the first, second, and third wafers of FIG. 3.

In this example wafer support 7 serves to mount the front wafers 1, 2, 3 and includes fiber guide openings 24 to aid in fiber insertion from the rear. Support 7 and housing 5 also includes positioning holes 26 and 28, respectively.

During assembly, the parts are assembled generally as shown in FIG. 1. The wafers 1, 2, 3 and support 7 are precisely aligned and all opening arrays aligned and parts seated and installed on housing 5. Fibers 6 are then installed and secured by any suitable method, such as those disclosed in U.S. patent application Ser. No. 09/841,686 filed Apr. 24, 2001. Since openings 12, 14, and 16 are larger than the fiber diameters, fibers 6 easily enter and extend through the aligned wafer openings. See FIG. 2. Once all fibers are seated with their tips extending through wafer 1 front face, wafer 2 is displaced, e.g., downward so that the sidewalls of openings 14 clamp or press respective fibers against the sidewalls of openings 12 and 16 of wafers 1 and 3. This clamping action can be seen in FIG. 3 and FIG. 8 hereof. One example of achieving displacement of wafer 2 is by use of spring actuator 30 that aligns on the top of wafer 2. Pressing on the top, center section of spring 30 causes wafer 2 to slide downward until the total clamping forces on all fibers overcome or resist the spring pressure. The vertically elongated openings 20 in wafer 2 enable the downward displacement. Spring 30 can continue to apply clamping pressure, if desired, until epoxy or bonding material can be applied and cured or otherwise harden to hold the various elements in place. Thereafter, the front face can be ground, polished, or otherwise treated as desired. The resulting assembly includes precisely positioned array of optical fibers.

It will be understood by those of ordinary skill in this art that various fixtures and standard devices can be used to retain housing 5 and other parts during assembly including positioning and retaining spring 30 until various parts are secured by cured or bonded materials.

An alternate embodiment according to the principles of the present invention includes a front wafer mask with individual fiber seats that clamp the fiber in precise positions. One example is shown in FIGS. 9–14 wherein front mask 40 includes an array of seats 42. In this example each seat 42 includes an opening 44 defined by stationary sidewalls 46, 48. A pair of flexible arms 50, 52 have their proximal ends 54, 56 integral with the stationary wafer and their distal ends 58, 60 free to move in the direction normal to the axial direction of the fiber.

Each end 58, 60 includes a surface 62, 64 that bounds opening 44. As better seen in FIGS. 12, 13 distal ends 58, 60 are preferably the same thickness as the wafer 40 and at least the mid-region of arms 50, 52 are etched to a thinner dimension to provide suitable flexing and spring action for arms 50, 52. In addition the various slots that define arms 50, 52 and distal ends 58, 60 are also precisely etched to enhance precise positioning of the seated fiber.

Figure 9:
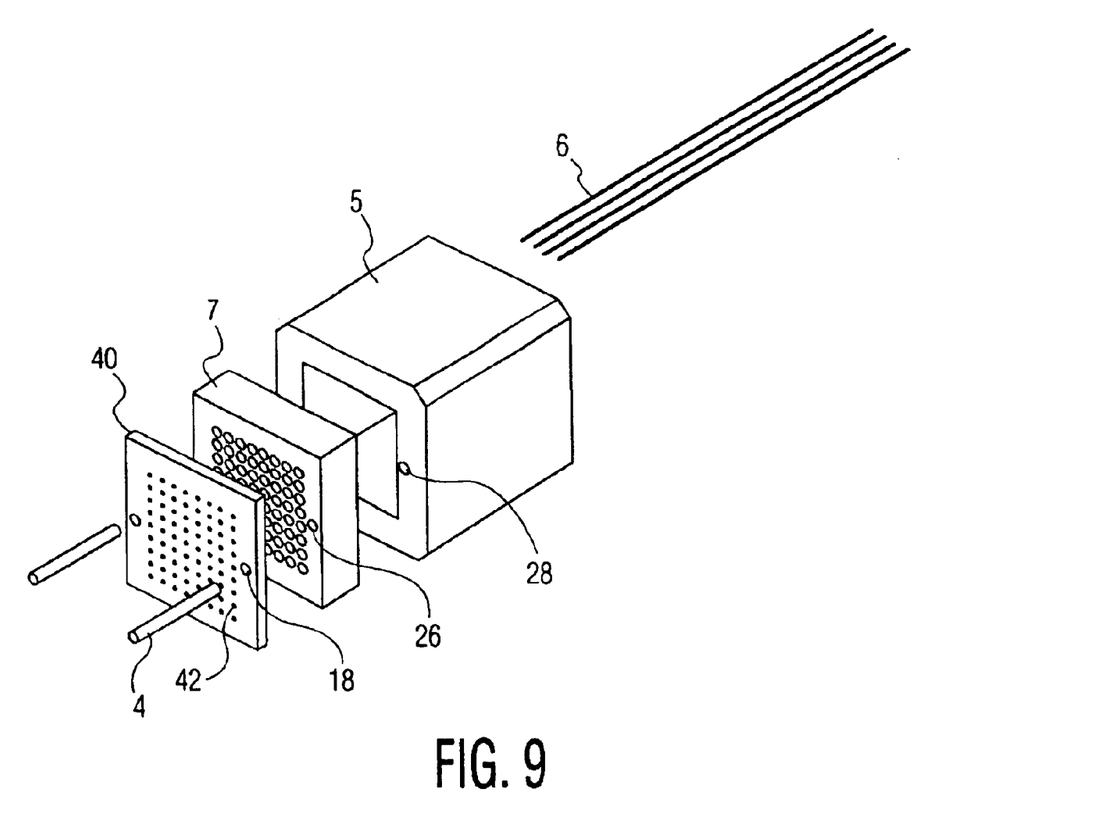
FIG. 9 is similar to FIG. 1 showing an alternate embodiment according to the principles of the present invention.
Figure 10:
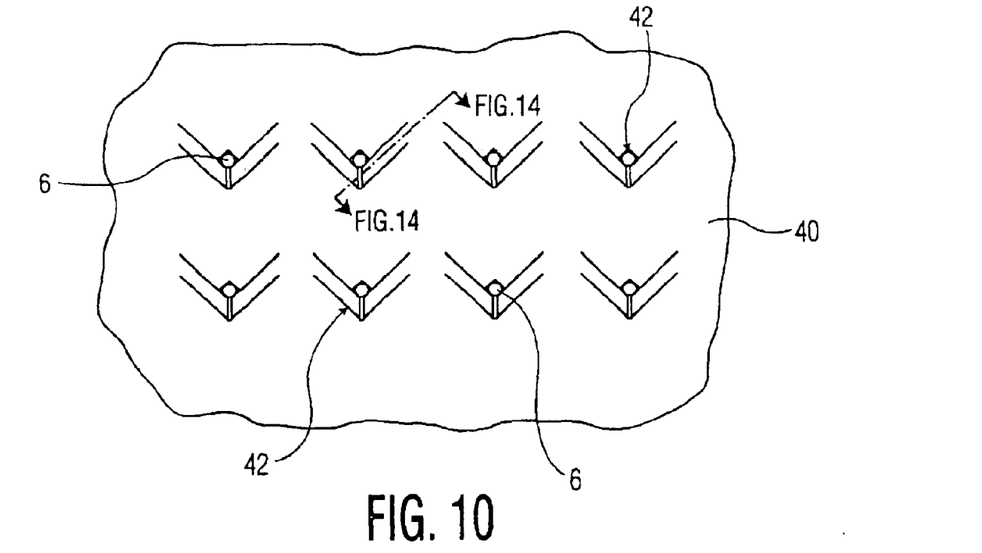
FIG. 10 is a partial front view of a portion of the front wafer mask 40.
Figure 11:
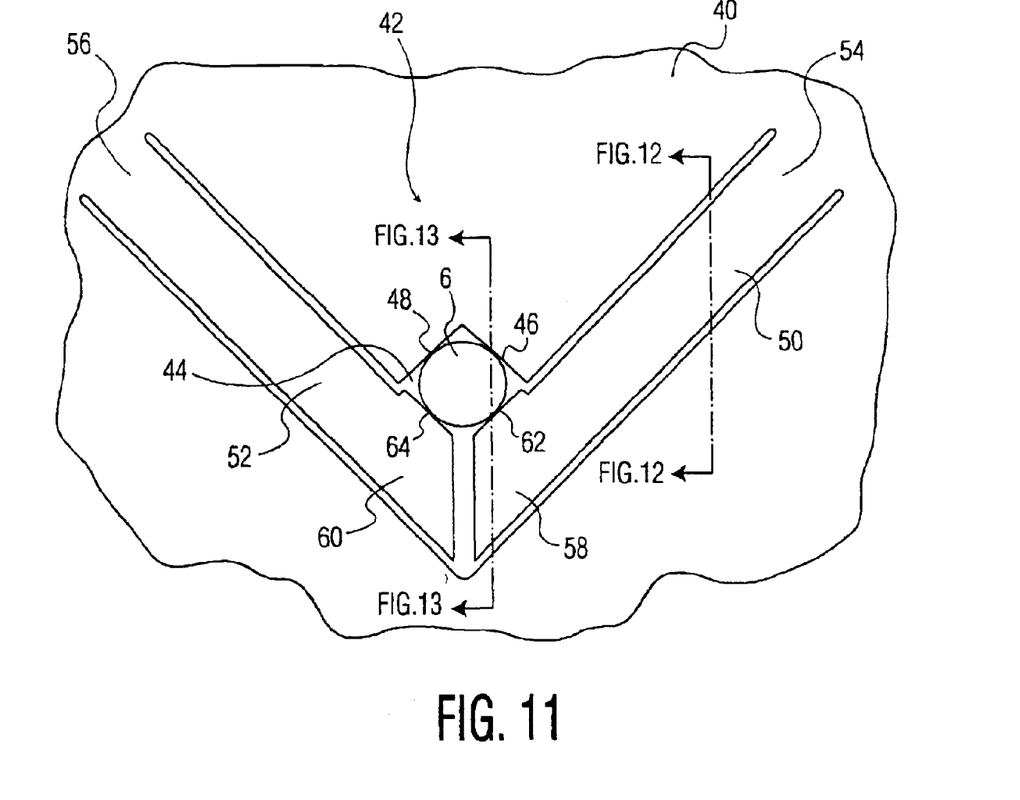
FIG. 11 is an enlarged view of one of the elements of opening 42 in FIG. 10.
Figure 12:
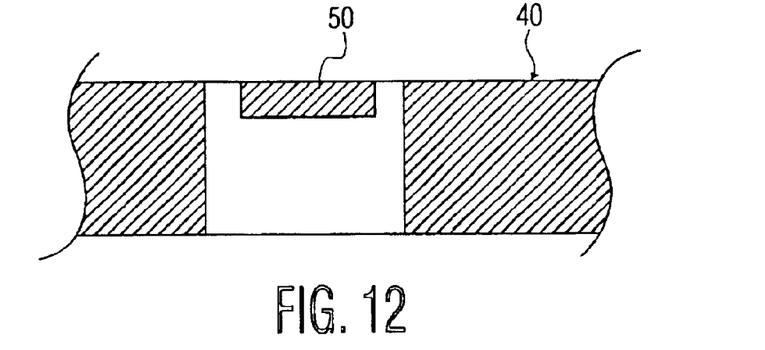
FIG. 12 is a section view taken along line A—A of FIG. 11.
Figure 13:
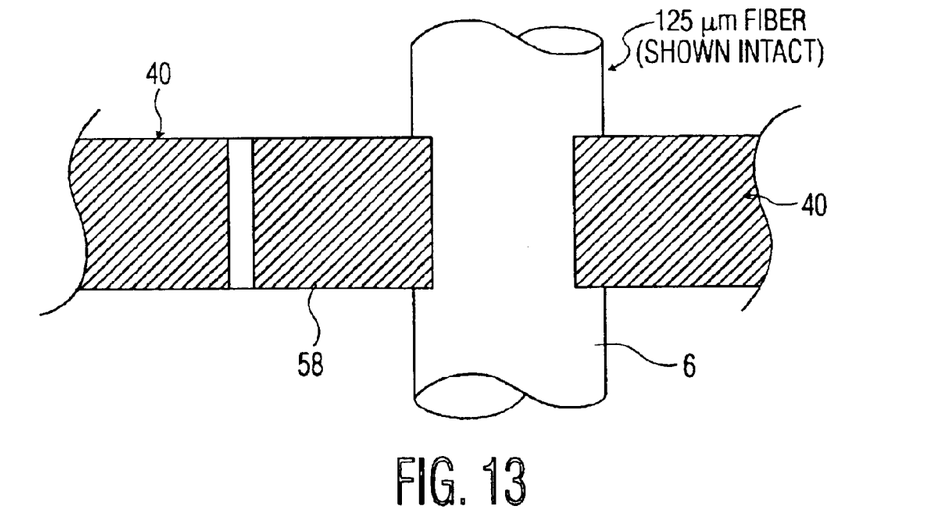
FIG. 13 is a section view taken along line B—B of FIG. 11.
Figure 14:
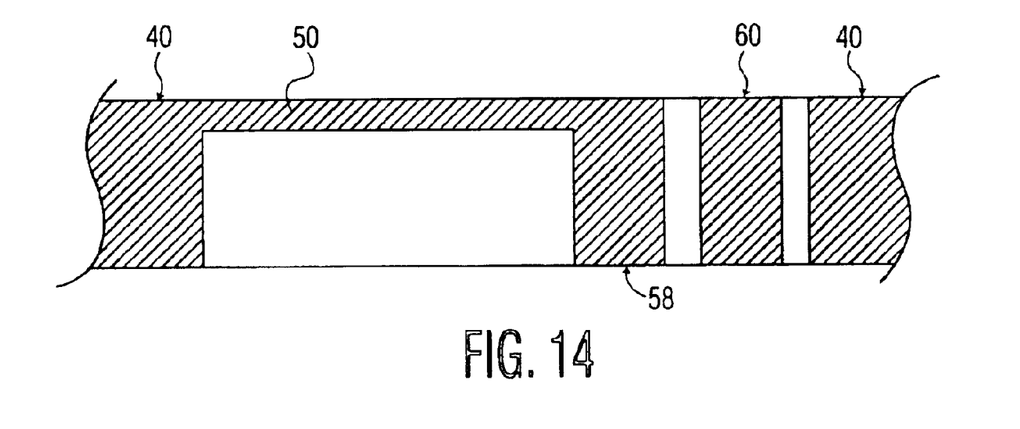
FIG. 14 is a section view taken along line C—C of FIG. 10.

In operation, wafer 40 is mounted to housing 5 by pins 4 or other suitable means spacer or guide masks 7 can be used as desired. Fiber 6 can be inserted individually or one row or column at a time or in some other sequence as desired. As each fiber tip is inserted through its respective seat 42, the fiber encounters the distal end 58, 60 sidewalls 64, 62. The contact or frictional forces applied to ends 58, 60 as fiber 6 advances forward are sufficient to bend or flex arms 50, 52 generally within the wafer plane to enlarge opening 44 causing ends 58, 60 to apply a slight spring or clamping force on fiber 6 surface urging fiber 6 against the precisely positioned stationary walls 46, 48 of opening 44. Once fully seated, arms 50, 52 continue to apply suitable clamping force on fiber 6 to secure the same while other fibers are seated in wafer 40 and subsequent process steps are performed, such as application of epoxy or bonding material, grinding, polishing, etc.

Figure 15:
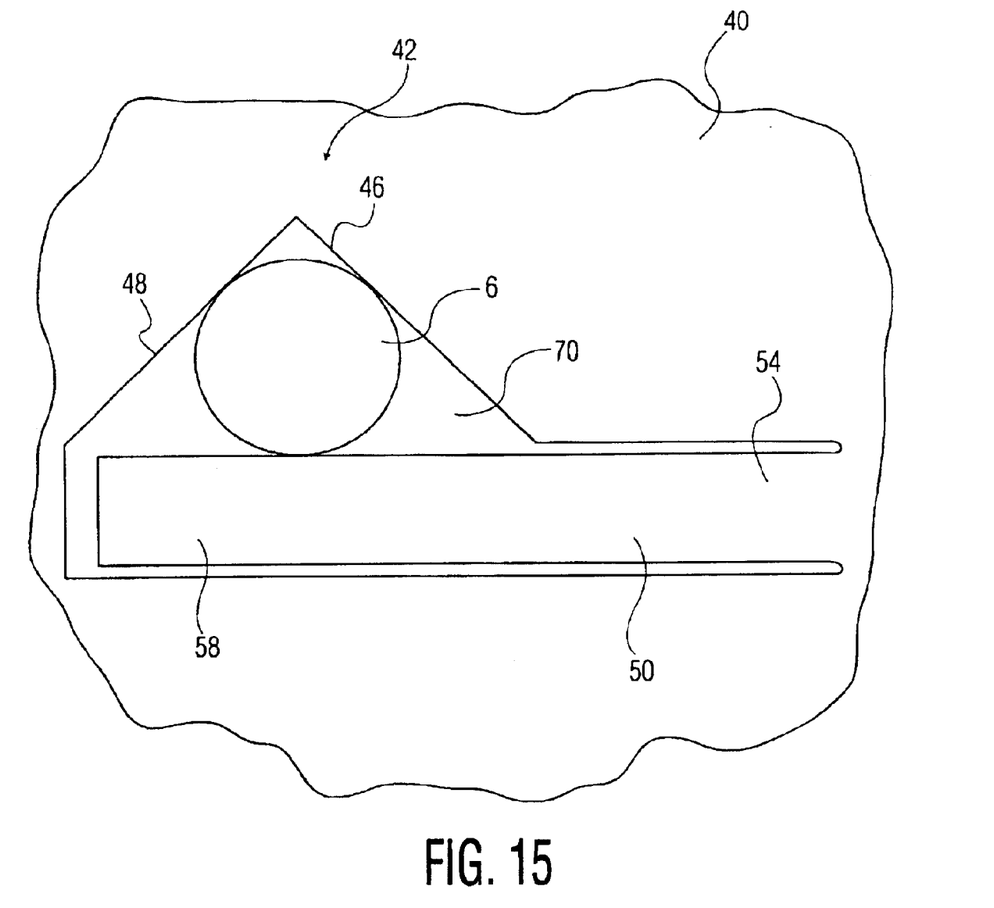
FIG. 15 is similar to FIG. 11 showing an alternate embodiment for the elements of seat 42.
Figure 16:
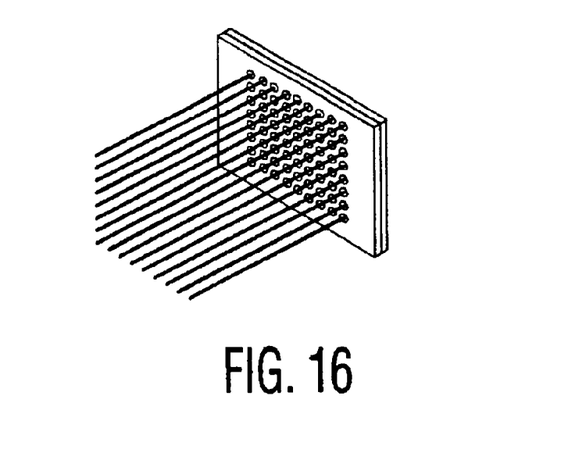
FIG. 16 is a pictorial, persective, partial view of the rear face of a guide mask and front mask with fibers shown extending rearward of yet a further alternate embodiment according to the present invention.
Figure 17:
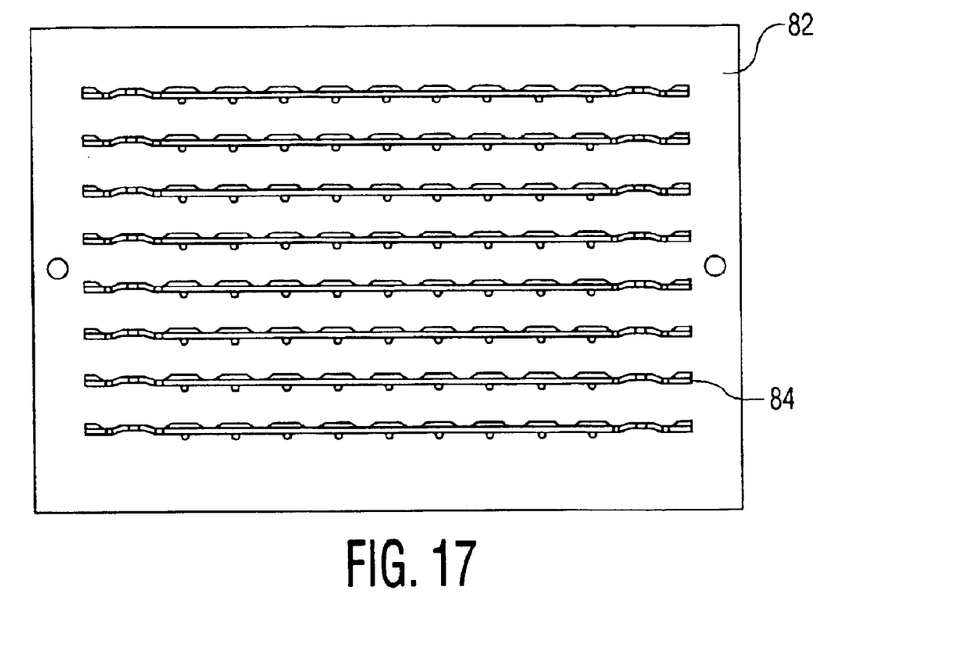
FIG. 17 is a rear view of the front mask of FIG. 16 before the fibers are installed.

An alternate configuration of elements for seats 42 is shown in FIG. 15. The shape of opening 70 is generally triangular and a single arm 50 clamps fiber 6 against stationary walls 46, and 48 generally as shown. Fiber insertion, seating, and clamping is essentially the same as described above except only the single arm 50 and distal end 58 flex and apply clamping force on fiber 6 instead of the two flex arm arrangement of FIG. 11.

Figure 18:
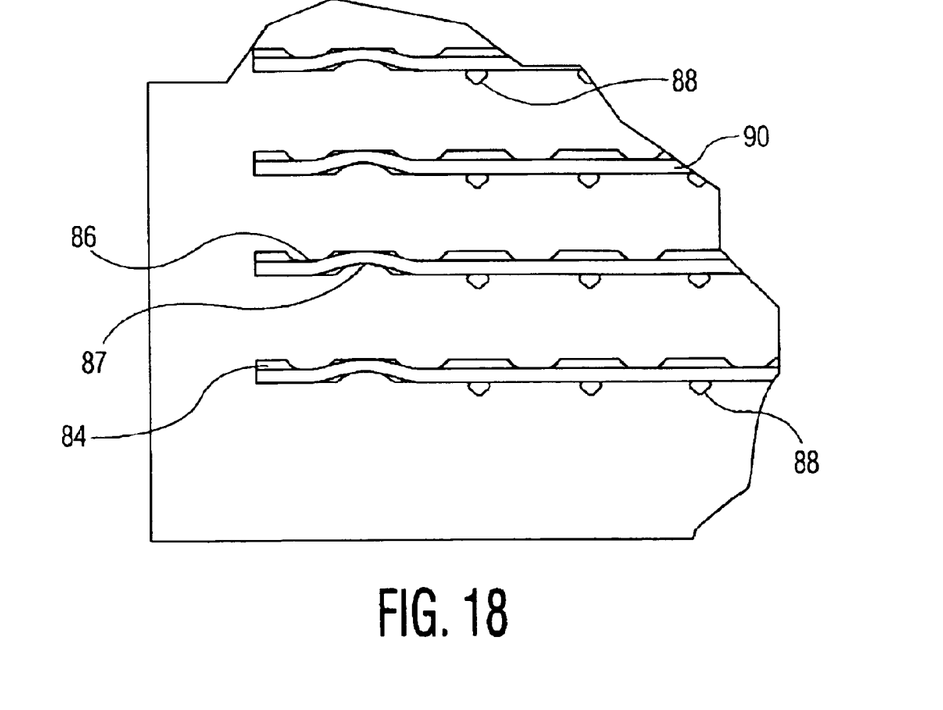
FIG. 18 is an enlarged partial view of the lower left corner of FIG. 17.
Figure 19:
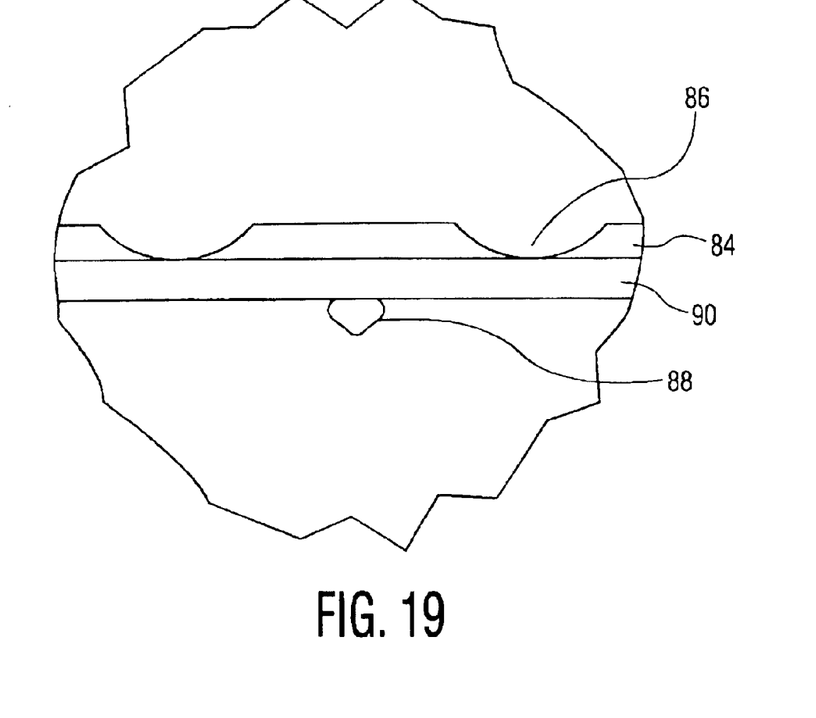
FIG. 19 is a further enlarged partial view of one of the slot and elongated member segments of FIG. 18.

Another embodiment according to the principles of the present invention is shown in FIGS. 16–21 wherein the front mask 82 includes a series of elongated slots 84 which are etched or laser cut through the wafer. The wafer defines a number of projections or dimples 86 spaced along the length and extending into each slot. Prior to fiber insertion, an elongated flexible member 90 is positioned from the back of the front mask along and within each slot generally as shown in FIG. 18 and has each end held between projections 86 and an upstanding projection 87 between the two outer projections 86. Member 90 can be made of polymide coated optical fiber, glass fiber, monofilament fishline or similar materials with the proper diameter or polyimide tubing, or any other suitable material. Wafer 82 also defines a series of fiber seats 88 formed through the wafer adjacent each slot bottom such that the opening in each seat 88 opens into or communicates with the slot. The cross sectional shape of seat 88 could be any suitable shape such as V-shaped or modified diamond-shaped generally as shown. Once members 90 are installed the rear wafer or guide mask 91 is positioned in contact with the rear of mask 82.

Figure 20:
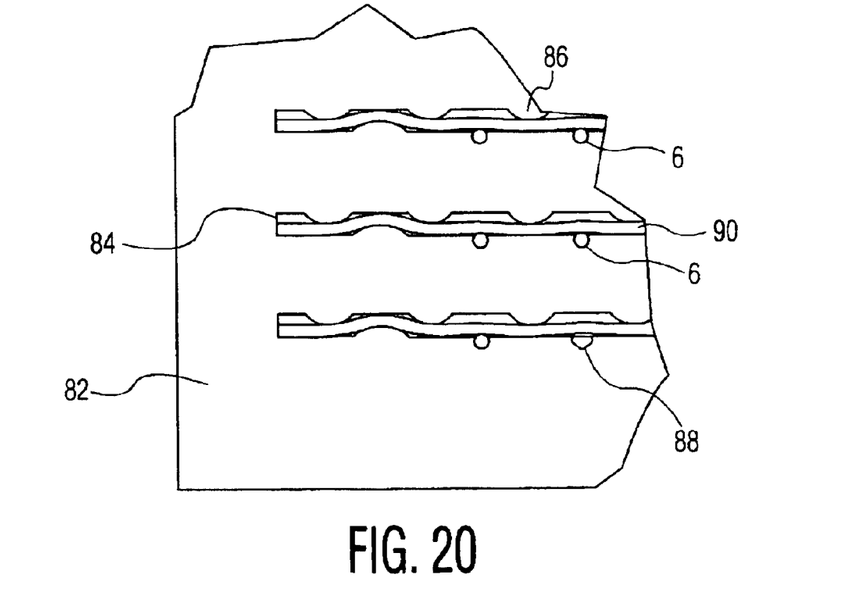
FIG. 20 is similar to FIG. 18 with the fibers installed.
Figure 21:
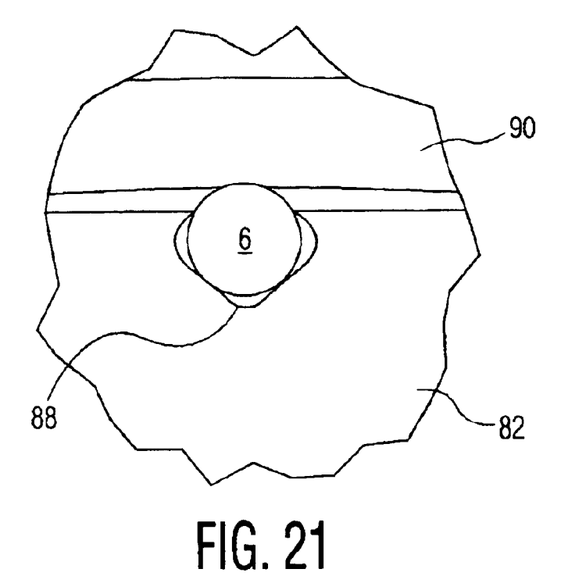
FIG. 21 is an enlarged partial view of FIG. 20 showing one of the fibers seated in a front mask opening and contacting the flexible member.
Figure 22:
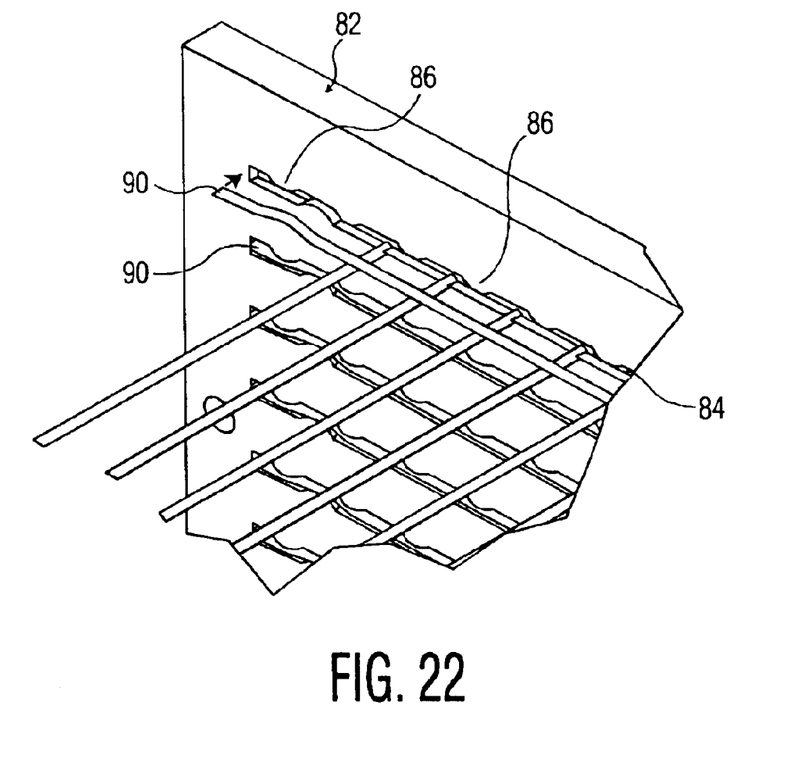
FIG. 22 is an exploded partial perspective view of the rear of the front mask showing the seated fibers and one of the flexible members pulled rear-ward to show the seated fiber end.
Figure 23:
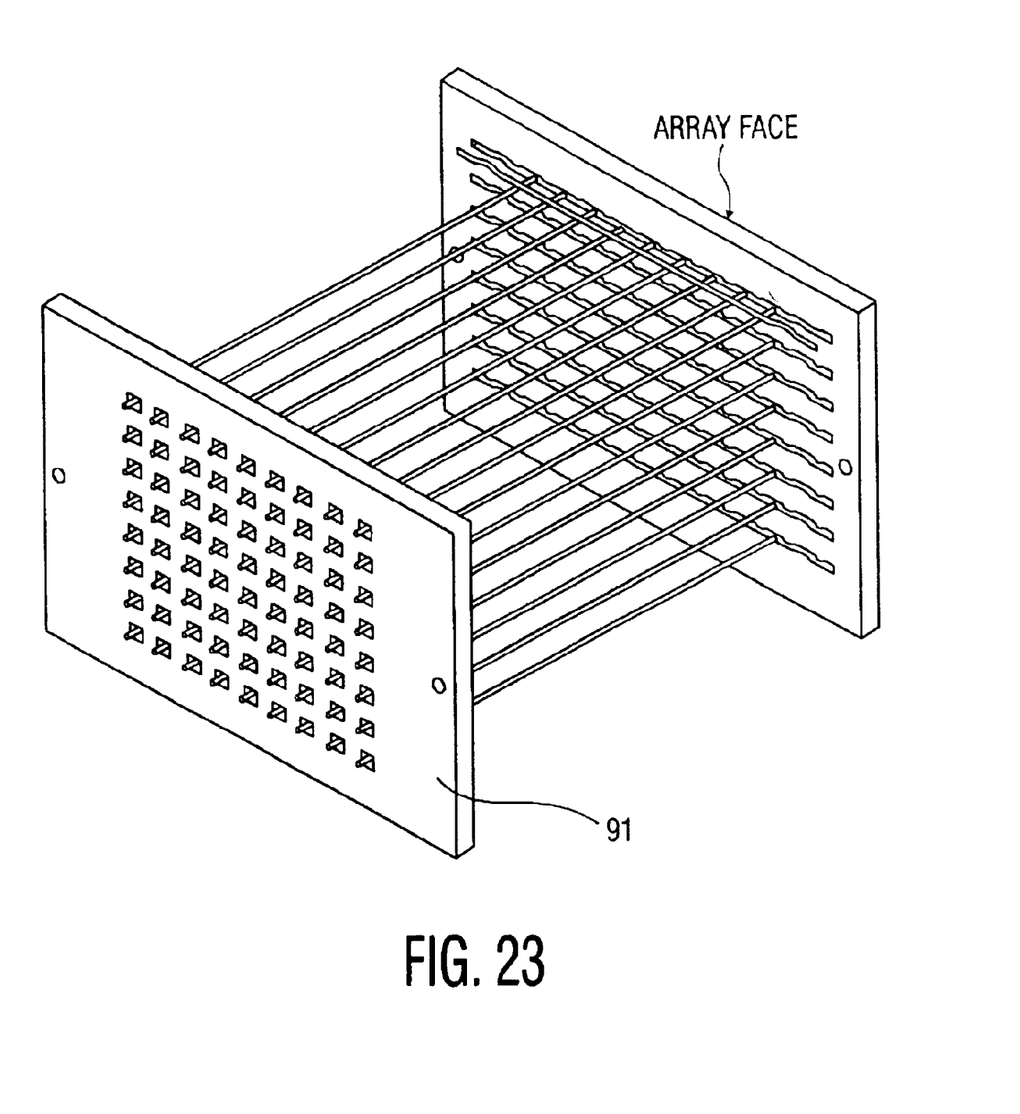
FIG. 23 is a reduced view of FIG. 22 also showing the rear of the guide mask or wafer 91.

As better seen in FIGS. 20, 21, after the two masks are assembled, fibers 6 can be inserted into seat openings in any suitable manner such as by row, column, individually or any other suitable sequence. Fiber 6 tips can be conically shaped to facilitate insertion and guide mask 91 can be used as desired. As each fiber 6 enters seat 88 opening its sidewalls engage the stationary sidewalls of seat 88. The outer (top) surface area of fiber 6 also engages the underside of member 90 and raises member 90 slightly. Projections 86 are positioned on either side of each seat 88. The flexed portion of member 90 presses or clamps fiber 6 precisely against the bottom two walls of seat 88 to precisely position fiber 6. Note each fiber 6 flexes a small portion of member 90 and each fiber 6 seating contributes to the overall pressure applied by member 90 on the full set of fibers in the row. Once, the row is finished the tension in the flexible member is enough to push the fibers into the bottom of the holes. The epoxy is then applied on the fibers to fill voids and cured to hold the fibers in place.

It should be understood that none of the drawings hereof are necessarily drawn to scale and dimensions are exaggerated to convey conceptual understanding. Fiber tips can be shaped to facilitate insertion through wafer holes and seats if desired. Various other improvements and modifications can be made to the exemplary embodiments disclosed herein without departing from the spirit and scope of the present invention.

What is claimed is:

1. An optical fiber array apparatus comprising a housing, a front mask coupled to said housing and having a matrix of fiber seating openings therethrough, each said opening having one or more stationary side walls, an unsheathed optical fiber portion extending through each of said openings and having an outer cylindrical side surface, means for pressing said side surface into engagement with said one or more side walls, wherein said means comprises at least one movable arm defined by and attached to said front mask, and each said arm having a contact portion that contacts said fiber for pressing said fiber against said one or more side walls, and the distance from said contact portion to the arm portion attached to a front mask portion being greater than the diameter of said fiber.

2. The apparatus of claim 1 wherein said means comprises at least two of said movable arms defined by said front mask.

3. The apparatus of claim 1 wherein said contact portion being near the distal end is located in an initial position relative to said one or more side walls and is moved away from said one or more side walls by said fiber when said fiber is inserted through said opening.

4. The apparatus of claim 1 wherein said at least one side wall comprises at least two side walls, and wherein said at least two side walls intersect each other and said fiber outer surface contacts each of said side walls and said means, and said means comprises at least two of said movable arms, the contact portion of each arm for pressing the fiber toward opposite ones of said two side walls.

5. An optical fiber array apparatus comprising a housing, a front mask coupled to said housing and having a matrix of fiber seating openings therethrough, each said opening having one or more stationary side walls, an unsheathed optical fiber portion extending through each of said openings and having an outer cylindrical side surface, means for pressing said side surface into engagement with said one or more side walls, wherein said front mask is primarily made of a first material, said means includes an element made of a second flexible material forming a flexible side wall of each front mask opening, said second material being more flexible than said first material.

6. The apparatus of claim 5 wherein said fiber engages and flexes said element when said fiber is inserted into its respective opening.

7. The apparatus of claim 6 wherein each of said elements are part of one of a plurality of elongated members.

8. The apparatus of claim 7 wherein said front mask comprises a plurality of elongated transverse slots and each of said openings opens into one of said slots, and each of said elongated members extends along one of said transverse slots.

9. An optical fiber array apparatus comprising a housing, a front mask coupled to said housing and having a matrix of fiber seating openings therethrough, each said opening having one or more side walls, an unsheathed optical fiber portion extending through each of said openings and having an outer cylindrical side surface, means for pressing said side surface into engagement with said one or more side walls, said means includes an element of flexible material forming one side wall of each front mask opening, wherein said fiber engages and flexes said element when said fiber is inserted into its respective opening, wherein each of said elements are part of elongated members, wherein said front mask comprises a plurality of elongated transverse slots and each of said openings opens into one of said slots, and wherein each of said members is secured in one of said slots.

10. The apparatus of claim 9 wherein said front mask includes projections projecting partially into each of said slot and each projection being located between two of said openings for restricting the movement of respective members portions when a fiber is inserted through the respective opening therebetween.

11. The apparatus of claim 1 wherein said front mask has a region about each said opening with a first thickness in a direction parallel to the opening axis, and each said arm has at least a mid-section second thickness in a direction parallel to the opening axis which is less than said first thickness.

12. The apparatus of claim 1 wherein each said front mask opening is larger in cross section than the cross section of said fiber portion and bonding material substantially fills a void between the fiber portion and opening side wall.

13. The apparatus of claim 5 wherein each said front mask opening is larger in cross section than the cross section of said fiber portion and bonding material substantially fills a void between the fiber portion and opening side wall.

* * * * *